(12) United States Patent
Kim et al.

(10) Patent No.: US 6,636,674 B2
(45) Date of Patent: Oct. 21, 2003

(54) FIGURE-8 OPTICAL FIBER PULSE LASER USING A DISPERSION IMBALANCED NONLINEAR OPTICAL LOOP MIRROR

(75) Inventors: Duck Young Kim, Kwangju (KR); Nak Hyoun Sung, Chungcheong-Namdo (KR)

(73) Assignee: Kwangju Institute of Science & Technology, Kwangju (KR)

( * ) Notice: Subject to any disclaimer, the term of this patent is extended or adjusted under 35 U.S.C. 154(b) by 408 days.

(21) Appl. No.: 09/779,636

(22) Filed: Feb. 9, 2001

(65) Prior Publication Data

US 2002/0106171 A1 Aug. 8, 2002

(30) Foreign Application Priority Data

Sep. 21, 2000 (KR) .......................... 2000-55423

(51) Int. Cl.[7] ................................. G02B 6/00
(52) U.S. Cl. ..................... 385/122; 385/42; 372/6; 359/134
(58) Field of Search ................ 385/122, 42, 46, 385/11; 359/115, 124, 127, 134; 356/345; 372/6, 18, 11, 94

(56) References Cited

U.S. PATENT DOCUMENTS

| | | | | |
|---|---|---|---|---|
| 5,365,531 A | * | 11/1994 | Lin et al. | 372/18 |
| 5,404,413 A | * | 4/1995 | Delavaux et al. | 385/15 |
| 5,852,700 A | * | 12/1998 | Caponi et al. | 385/123 |
| 5,898,716 A | * | 4/1999 | Ahn et al. | 372/6 |

* cited by examiner

*Primary Examiner*—Robert H. Kim
*Assistant Examiner*—George Wang
(74) *Attorney, Agent, or Firm*—Bacon & Thomas, PLLC

(57) ABSTRACT

The figure-8 optical fiber pulse laser according to the present invention produces stable femto-second optical pulses using DI-NOLM. The optical amplifier is not included in DI-NOLM, instead, it is located at the unidirectional linear loop part. And the noise due to the bidirectional gain difference of the optical amplifier is reduced. Two optical fibers of different dispersion values are used at DI-NOLM. Therefore, the present invention provides a figure-8 optical fiber pulse laser using DI-NOLM improving the switching characteristic. Especially, the stable femto-second laser according to the present invention is applicable for the many applications such as high-speed reaction measurements, laser treatments, and medical lasers.

5 Claims, 3 Drawing Sheets

US 6,636,674 B2

FIGURE-8 OPTICAL FIBER PULSE LASER USING A DISPERSION IMBALANCED NONLINEAR OPTICAL LOOP MIRROR

BACKGROUND OF THE INVENTION

1. Field of the Invention

The present invention relates generally to a figure-8 optical fiber pulse laser using a dispersion imbalanced nonlinear optical loop mirror (DI-NOLM). More particularly, it relates to a new type of the figure-8 optical fiber pulse laser generating stable femto-second optical pulse trains.

2. Description of the Related Art

Generally, the mode-lock method of this laser is a skill to produce a pulse train of narrow pulse width using a laser, and it is divided into the active mode-lock method and the passive one. The conventional figure-8 optical fiber laser is one of the passively mode-locked optical fiber lasers. It may produce a femto-second optical pulse train, but it has a difficulty to produce stable pulse trains. In order to improve the switching effect of a nonlinear optical loop mirror (NOLM) as a switch of the figure-8 optical fiber laser, an optical amplifier is added into the NOLM to form a nonlinear amplifying loop mirror (NALM). The NALM considerably improves the switching effect of the NOLM.

FIG. 1 shows a schematic diagram for the conventional figure-8 optical fiber laser. The nonlinear loop part comprises a pump LD (laser diode) (10), a WDM (wavelength division multiplexing mirror) coupler (15), an EDF (erbium doped optical fiber) (20), a DSF (dispersion shifted fiber) (25), and a PC (polarization controller) (30). On the other hand, the linear loop part comprises a PC (30), a BPF (optical band pass filter) (40), an optical isolator (45), and an output coupler (50). As shown in FIG. 1, the figure-8 optical fiber laser is composed of the linear loop part and the nonlinear part switching the optical pulse train. Here, the optical gain is achieved through the EDF (20), and the switching part is composed of the NALM.

The optical amplifier, EDF (20), is not located at the center of the NALM but lopsided. The optical pulses inputted to the NALM are divided into two through the optical coupler (35). One of them propagates the loop clockwise, and it first passes the optical amplifier, EDF (20), and then, DSF (25). While, the other propagates the loop counterclockwise, and it passes DSF (25), and then EDF (20). Since the nonlinear phase shift of the clockwise pulse is greater than that of the counterclockwise pulse, the self-switching phenomena occur when two pulses meet at the optical coupler (35). The width of the self-switched pulse becomes narrower, and the pulse is amplified again at the EDF (20). Accordingly, the figure-8 optical fiber laser produces the narrow optical pulses.

However, it is difficult to produce the stable pulse train due to the noise and the stimulated Brillouin scattering. The noise is originated from the bidirectional gain difference of the optical amplifier, and the stimulated Brillouin scattering with nonlinear characteristic is from the bidirectional pulses propagating the optical amplifier.

SUMMARY OF THE INVENTION

The present invention is contrived in order to solve the above problem. It is an object of the present invention to provide a figure-8 optical fiber pulse laser with a dispersion imbalanced nonlinear optical fiber loop mirror (DI-NOLM). The laser according to this invention produces stable femtosecond optical pulse trains using DI-NOLM.

In order to attain the above object, the optical amplifier is not included in the NOLM, instead, it is located at the unidirectional linear loop part. And the noise due to the bidirectional gain difference of the optical amplifier is reduced. Two optical fibers of different dispersion values are used at DI-NOLM. Therefore, present invention provides a figure-8 optical fiber pulse laser with a dispersion imbalanced nonlinear optical fiber loop mirror (DI-NOLM) improving the switching characteristic.

BRIEF DESCRIPTION OF THE DRAWINGS

Exemplary embodiments of the present invention will be described in conjunction with the drawings in which.

Figure 1:
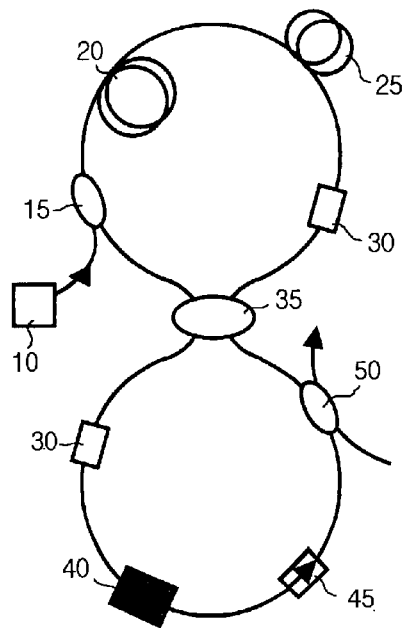
FIG. 1 shows a schematic diagram for the conventional figure-8 optical fiber laser.

<Explanations for Main Symbols in the Drawings>
100: pump laser diode (LD)
150: wavelength division multiplexing coupler (WDM coupler)
200: erbium doped fiber (EDF)
250: optical isolator
300: optical band pass filter (BPF)
350: output coupler
400: optical coupler
450: dispersion compensated fiber (DCF)
500: polarization controller (PC)
550: single mode fiber (SMF)
600: dispersion shifted fiber (DSF)

DETAILED DESCRIPTION OF THE EMBODIMENTS

Figure 2:
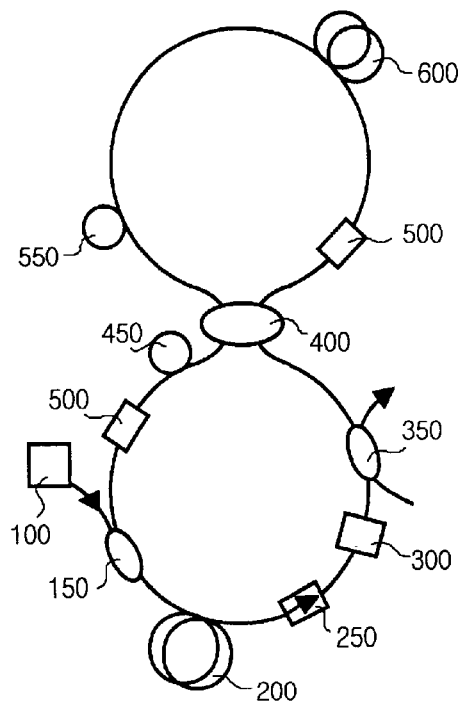
FIG. 2 shows a schematic diagram for a figure-8 optical fiber laser according to the first embodiment of the present invention.

FIG. 2 shows a schematic diagram for an optical fiber laser according to the first embodiment of the present invention. The dispersion values are unbalanced at the nonlinear optical loop mirror, and the stable switching is accomplished. The linear loop part comprises a pump LD (100), a WDM coupler (150), an EDF (200), an isolator (250), a BPF (300), an output coupler (350), a DCF (dispersion compensated fiber) (450), and a PC (500). On the other hand, the nonlinear loop part comprises a SMF (single mode fiber) (550), a DSF (600), and a PC (500). An optical coupler (400) combines the linear part and the nonlinear part as shown in FIG. 2.

EDF (200) is used as an amplifier in the linear part of the figure-8 optical fiber. Where, the optical pulses are propagating through the EDF (200) unidirectionally using the optical isolator (250). And the several unstable phenomena due to the bidirectional propagation through EDF (200) are removed.

In addition, DI-NOLM is used for the switching role in the nonlinear part of the figure-8 optical fiber laser.

DI-NOLM includes two optical fibers, SMF (550) and DSF (600), with different chromatic dispersion values, and the optical pulses are chirped through DCF (450) at the lower loop of the figure-8 laser. The optical pulses are divided into two at the 3-dB optical coupler (400). One of them propagates the loop clockwise, while, the other propagates the loop counterclockwise. The clockwise pulses become broader at SMF (550), and then pass DSF (600). On the other hand, the counterclockwise pluses pass DSF (600) first, and then, become broader at SMF (550). Since the nonlinear phase shift of the optical pulse is proportional to the peak intensity at DSF (600), the shift is greater for the counter clockwise pulse. And when two pulses are combined at the 3-dB optical coupler (400), the self-switching effect is achieved due to the different nonlinear phase shifts of the pulses. The self-switched optical pulses become narrower due to DCF (450), then these are amplified at EDF (200), and the figure-8 optical fiber laser produces narrow optical pulses.

Figure 3:
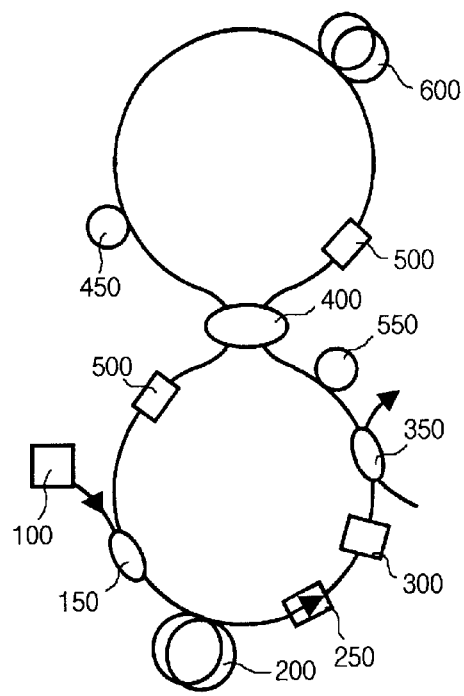
FIG. 3 shows a schematic diagram for a figure-8 optical fiber laser according to the second embodiment of the present invention.

FIG. 3 shows a schematic diagram for an optical fiber laser according to the second embodiment of the present invention. The linear loop part comprises a pump LD (100), a WDM coupler (150), an EDF (200), an optical isolator (250), a BPF (300), an output coupler (350), a SMF (550), and a PC (500), while the nonlinear loop part comprises a DCF (450), a DSF (600), and a PC (500). An optical coupler (400) combines the linear part and the nonlinear part as shown in FIG. 3.

The second embodiment in FIG. 3 is similar to the first one in FIG. 2; SMF (550) is interchanged with DCF (450). The optical pulses are chirped through SMF (550) at the lower loop of the figure-8 laser. The optical pulses are divided into two at the 3-dB optical coupler (400). One of them propagates the loop clockwise, while, the other propagates the loop counterclockwise. The clockwise pulses become narrower at DCF (450), and then pass DSF (600). On the other hand, the counterclockwise pluses pass DSF (600) first, and then, become narrower at DCF (450). Thus, the nonlinear phase shift of the clockwise pulse is greater than that of the counter clockwise pulse. When two pulses are combined at the 3-dB optical coupler (400), the self-switching effect is achieved due to the different nonlinear phase shifts of the pulses.

Figure 4:
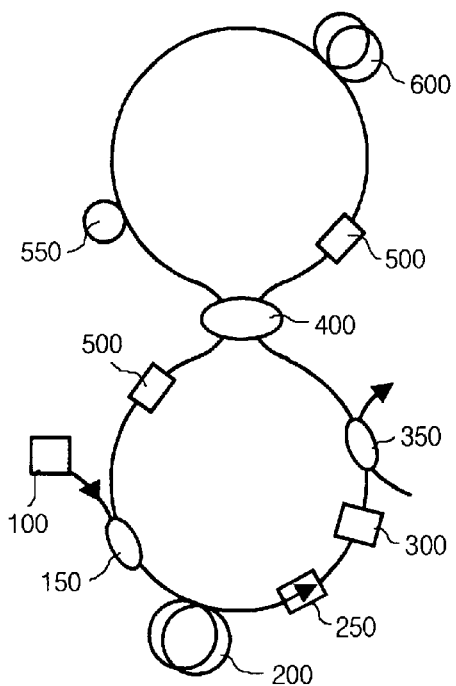
FIG. 4 shows a schematic diagram for a figure-8 optical fiber laser according to the third embodiment of the present invention.

FIG. 4 shows a schematic diagram for an optical fiber laser according to the third embodiment of the present invention. The linear loop part comprises a pump LD (100), a WDM coupler (150), an EDF (200), an optical isolator (250), a BPF (300), an output coupler (350), and a PC (500), while the nonlinear loop part comprises a SMF (550), a DSF (600), and a PC (500). An optical coupler (400) combines the linear part and the nonlinear part as shown in FIG. 4.

The third embodiment in FIG. 4 is similar to the first one in FIG. 2; DCF (450) is eliminated at the lower loop of the figure-8 laser. Only the chirped optical pulses propagate through DI-NOLM by acquiring the self-switching effect due to the functional principles. And, when the optical pulses are amplified at EDF (200), only the self-chirped pulses survive to pass through DI-NOLM, and return to EDF (200). Therefore, the figure-8 optical fiber laser produces narrow optical pulses.

Figure 5:
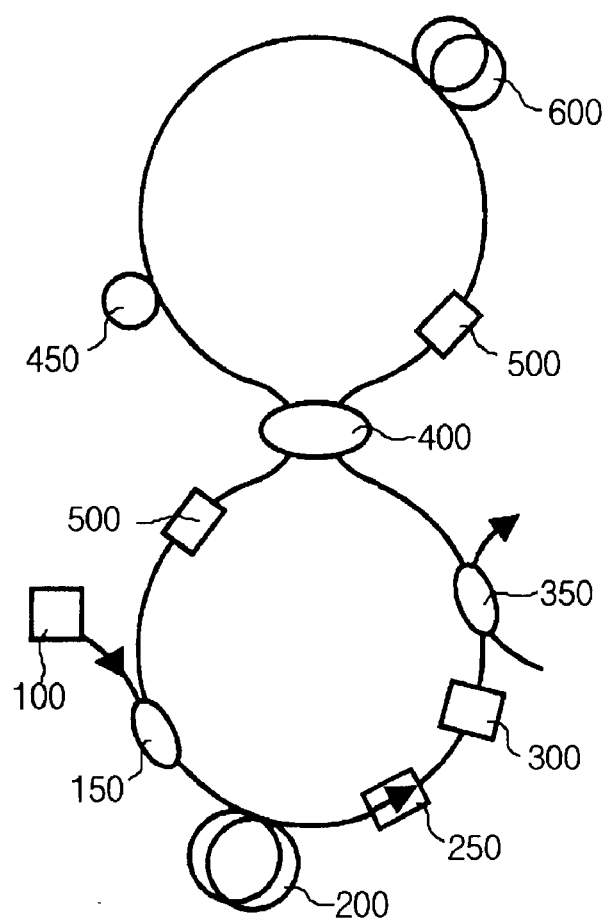
FIG. 5 shows a schematic diagram for a figure-8 optical fiber laser according to the forth embodiment of the present invention.

FIG. 5 shows a schematic diagram for an optical fiber laser according to the forth embodiment of the present invention. The linear loop part comprises a pump LD (100), a WDM coupler (150), an EDF (200), an optical isolator (250), a BPF (300), an output coupler (350), and a PC (500), while the nonlinear loop part comprises a DCF (450), a DSF (600), and a PC (500). An optical coupler (400) combines the linear part and the nonlinear part as shown in FIG. 5.

The forth embodiment in FIG. 5 is similar to the second one in FIG. 3; SMF (550) is eliminated at the lower loop of the figure-8 laser. As explained in FIG. 4, when the optical pulses are amplified at EDF (200), only the self-chirped pulses survive to pass through DI-NOLM, and return to EDF (200). Therefore, the figure-8 optical fiber laser produces narrow optical pulses.

As mentioned so far, the figure-8 optical fiber pulse laser using a dispersion imbalanced nonlinear optical fiber loop mirror (DI-NOLM) according to the present invention produces the following effects. Since the lights are confined all within the optical fiber in the laser according to the present invention, the present laser is smaller than the conventional one, is more stable against impacts, and is easy to move and to construct using an optical fiber splicer. In addition, the present invention improves the structure of the conventional figure-8 optical fiber laser, and realizes a figure-8 optical fiber laser with new structure producing stable femto-second optical pulse trains. Especially, the stable femto-second laser is applicable for the many applications such as high-speed reaction measurements, laser treatments, and medical lasers.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A figure-8 optical fiber pulse laser using a dispersion imbalanced nonlinear optical fiber loop mirror (DI-NOLM) comprising;
   a linear part of the figure-8 optical fiber laser composed of a pump laser diode (LD), a wavelength division multiplexing (WDM) coupler, an erbium doped fiber (EDF), an optical isolator, a band pass filter (BPF), an output coupler, a dispersion compensated fiber (DCF), and a polarization controller (PC);
   a nonlinear loop part, DI-NOLM, composed of a single mode fiber (SMF), a dispersion shifted fiber (DSF), and a PC; and
   an optical coupler combining the linear loop part and the nonlinear loop part;
   and wherein;
   the optical pulses are divided into two at the optical coupler;
   one of them propagates the nonlinear loop clockwise;
   the other propagates the loop counterclockwise;
   the clockwise pulses become broader at the SMF, and then pass the DSF;
   the counterclockwise pluses pass the DSF first, and then, become broader at the SMF; and
   the self-switched optical pulses are produced.

2. A figure-8 optical fiber pulse laser using a dispersion imalanced nonlinear optical fiber loop mirror (DI-NOLM) as defined in claim 1, wherein
   the DCF is eliminated at the linear loop part;
   only the chirped optical pulses propagate through DI-NOLM; and
   the self-switched optical pulses are produced.

3. A figure-8 optical fiber pulse laser using a dispersion imbalanced nonlinear optical fiber loop mirror (DI-NOLM) as defined in claim 1, wherein the center wavelength of the optical pulse is controlled using the BPF of the linear loop part.

4. A figure-8 optical fiber pulse laser using a dispersion imbalanced nonlinear optical fiber loop mirror (DI-NOLM) comprising;
- a linear part of the figure-8 optical fiber laser composed of a pump laser diode (LD), a wavelength division multiplexing (WDM) coupler, an erbium doped fiber (EDF), an optical isolator, a band pass filter (BPF), an output coupler, a single mode fiber (SMF) and a polarization controller (PC);
- a nonlinear loop part, DI-NOLM, composed of a dispersion compensated fiber (DCF), a dispersion shifted fiber (DSF), and a PC; and
- an optical coupler combining the linear loop part and the nonlinear loop part;

and wherein;
- the optical pulses are divided into two at the optical coupler;
- one of them propagates the nonlinear loop clockwise;
- the other propagates the loop counterclockwise;
- the clockwise pulses become narrower at the DCF, and then pass the DSF;
- the counterclockwise pluses pass the DSF first, and then, become narrower at the SMF; and
- the self-switched optical pulses are produced.

5. A figure-8 optical fiber pulse laser using a dispersion imbalanced nonlinear optical fiber loop mirror (DI-NOLM) as defined in claim 4, wherein
- the SMF is eliminated at the linear loop part;
- only the chirped optical pulses propagate through DI-NOLM; and
- the self-switched optical pulses are produced.

* * * * *